Figure 1:
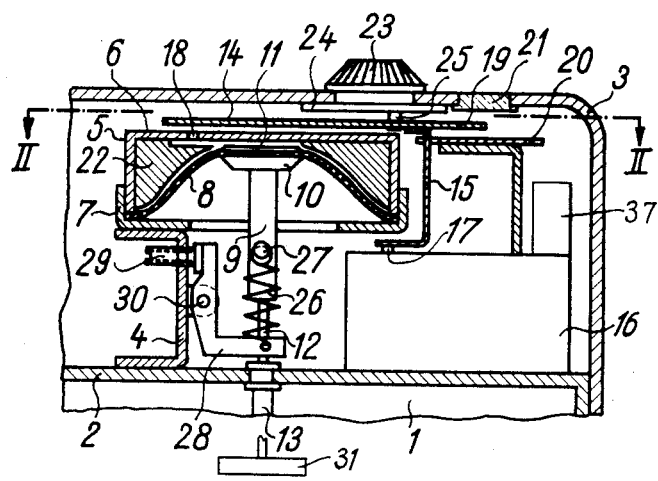

Oct. 18, 1960   F. BIEDERMANN ET AL   2,956,488
PHOTOGRAPHIC CAMERA WITH AUTOMATIC SHUTTER RETARDING DEVICE
Filed Aug. 2, 1957

INVENTOR.
Friedrich BIEDERMANN, Friedrich BESTENREINER
BY
Connolly and Hutz
ATTORNEYS

United States Patent Office 2,956,488
Patented Oct. 18, 1960

2,956,488

PHOTOGRAPHIC CAMERA WITH AUTOMATIC SHUTTER RETARDING DEVICE

Friedrich Biedermann and Friedrich Bestenreiner, Munich, Germany, assignors to AGFA Aktiengesellschaft, Leverkusen-Bayerwerk, Germany, a corporation of Germany Filed Aug. 2, 1957, Ser. No. 675,907

Claims priority, application Germany Sept. 25, 1956

11 Claims. (Cl. 95—10)

This invention relates to a photographic camera with an automatic shutter retarding device which can be optionally switched on or off, and more particularly relates to such a camera which includes an automatic shutter retarding device which is photoelectrically controlled.

There are existing cameras which include photoelectrically controlled pneumatic automatic shutter retarding devices in addition to the conventional mechanical shutter retarding mechanism. Heretofore, these pneumatic retarding devices have been disconnected from the shutter when automatic operation is not desired. This has necessitated the use of a relatively complicated and expensive mechanism for positively preventing misalignment of the pneumatic retarding device when it is disengaged.

In accordance with this invention, a photoelectrically controlled pneumatic automatic shutter retarding device in a camera is inseparably connected with the shutter. An inactivating means is incorporated in this automatic retarding device for setting it at a precise predetermined retarding condition. For example, in a camera in which the aforementioned retarding device is a pneumatic device including a perforated valve plate and a photoelectrically controlled flow obstructing member, the inactivating device is constructed and arranged to move the flow obstructing member out of range of the perforations or orifices in the valve plate. Preferably, this inactivating device includes a projection which rotates the flow obstructing member out of range of the orifices in the valve plate. This inactivating projection can also be used to arrest the flow obstructing member at various predetermined positions when the photoelectric cell is blocked off from ambient illumination to permit the pneumatic retarding device to be manually set to provide preselected exposure times.

Furthermore, in cameras including at least two separate shutter retarding devices which are alternately utilized and one of these devices is inseparably connected with the shutter and includes an inactivating mechanism for adjusting it to a predetermined minimum retarding action; a force-applying device may be connected to the shutter to compensate for even the slight retarding effect which still occurs when the retarding device is inactivated. For example, this force-applying device is an adjustable tension spring which cooperates with the main shutter-driving member in accelerating the motion of the inactivated retarding device.

This invention has the advantage of being capable of substantially completely removing the influence of a photoelectrically operated automatic shutter retarding device without uncoupling or separating it from the shutter. This dispenses with the necessity for relatively complicated auxiliary members for detachably coupling the photoelectrically controlled automatic shutter retarding device with the shutter. This inactivating device is extremely simple in construction and operation, and it may, therefore, be easily operated and utilized by inexperienced photographers. The use of the compensating spring permits even the minute retarding effect of the inactivated automatic device to be substantially completely eliminated.

Figure 2:
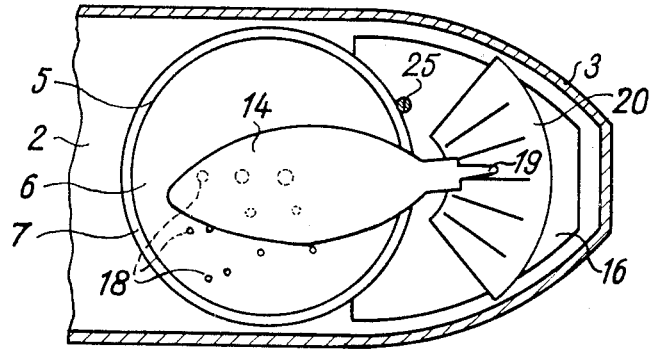
Figure 3:
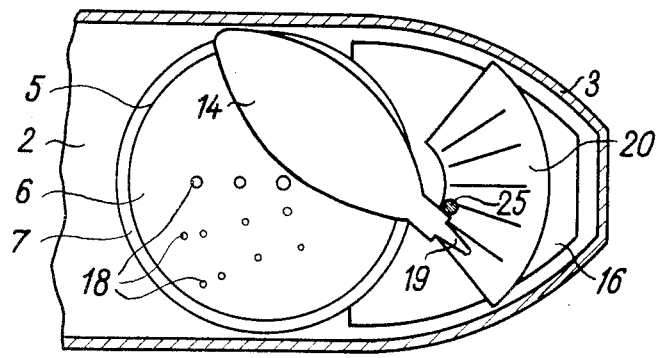

Novel features and advantages of the present invention will become apparent to one skilled in the art from a reading of the following description in conjunction with the accompanying drawings in which similar reference characters refer to similar parts and in which:

Fig. 1 is a cross-sectional view in elevation of one embodiment of this invention;

Fig. 2 in a cross-sectional view taken through Fig. 1 taken along the line II—II and looking in the direction of the arrows and showing the activated phase of operation; and Fig. 3 is a view similar to Fig. 2 in the inactivated phase of operation.

In Figs. 1 and 2, a portion of the camera housing 1 includes a plate 2 horizontally disposed, for example, a short distance below the top of the housing cover 3. A structural member 4 is mounted upon plate 2 for supporting cylinder 5 of a pneumatic retarding device which automatically adjusts the exposure time provided by the shutter. This pneumatic retarding device is, for example, generally similar to the device disclosed in Belgian Patent 516,387, granted on January 15, 1953. This pneumatic retarding device also includes a valve plate or disc 6 and a flexible diaphragm 8, which is secured between the wall of cylinder 5 and the bottom of mounting ring 7 within which cylinder 5 is inserted. A rod 9 is connected substantially with the center of diaphragm 8 by means of opposed flanges 10 and 11. The other side of rod 9 is connected, for example, by stem or cable 12 through hollow tube 13 with a movable element (not shown) of the shutter which is schematically represented by block 31 and which represents, for example, a conventional shutter which incorporates a known type of manually adjustable retarding device. This movable element is characterized in that the exposure time provided by the shutter is a function of the speed of movement of the movable element. This element is, for example, the main drive member of the shutter.

A flow obstructing element 14 is connected to the moving element (not shown) of a galvanometer 16 by means of arm 15. This moving element of the galvanometer 16 is, for example, a rotating coil which is electrically connected with the photoelectric cell (not shown) of the photoelectric exposure regulating device. Flow obstructing member 14 is, therefore, moved with support arm 15 which is rotated by shaft 17 of said rotating coil in accordance with the current developed by the photoelectric cell 37 to cover a greater or smaller amount of perforations or orifices 18 disposed upon valve plate 6.

In Fig. 1 diaphragm 8 and rod 9 are shown in the positions that they assume when the shutter is cocked or tensioned. As the shutter is operated, diaphragm 8 and rod 9 move downward in response to movement of the main drive member of the shutter to which the cable 12 is connected. This movement of the diaphragm 8 draws a flow of air through orifices 18 which flow is greater or smaller in accordance with the position of flow obstructing member 14. The retarding effect of this pneumatic device is accordingly smaller or greater in accordance with the position of flow obstructing member 14 which correspondingly regulates the automatically controlled exposure time of the shutter. This exposure time is indicated by means of a pointer 19 attached to flow obstructing member 14 whose position relative to scale 20 is visible through window 21.

A profile ring 22 is constructed and arranged to provide a curved space under valve plate 6 which maintains the volume of air between diaphragm 8 and valve plate 6 as small as possible when the shutter is in a tensioned condition and before it initiates downward movement of diaphragm 8. Diaphragm 8 is, therefore, capable of being tightly maintained in contact with the adjacent surface of profile ring 22 when the shutter is in a tensioned condition as shown in Fig. 1.

A manually rotatable knob 23 is mounted through the top of housing cover 3, and it is connected to element 24, for example a disc 24, disposed within housing cover 3. A pin 25 is mounted upon disc 24. Pin 25 is constructed and arranged upon disc 24 to normally lie out of the exposure setting range of movement of a flow-obstructing member 14 and attached pointer 19. In this position, as shown in Figs. 1 and 2, the movement of flow-obstructing member 14 in accordance with the photoelectric current flowing through the galvanometer is not affected.

However, when a flash bulb picture, for example, is to be taken and the conventional mechanical retarding device (not shown) which is incorporated in the shutter (also not shown) is utilized, the pneumatic retarding device is inactivated. This inactivation is accomplished by rotation of knob 23 to bring pin or projection 25 into contact with pointer 19, for example, of flow-obstructing member 14. This rotates flow-obstructing member 14 against the opposing force of the moving element of the galvanometer into the position shown in Fig. 3. Flow-obstructing member 14 is thereby moved out of range of all of the orifices 18 in valve plate 6. This reduces the retarding effect of the pneumatic retarding device to a slight predetermined minimum retarding influence on the shutter. This minimum retarding influence includes, among other phenomena, the frictional resistance of the moving parts of the pneumatic retarding device and linkage 12 and 13 which connects it to the shutter.

Projection or pin 25 and associated members 23 and 24 in the position shown in Fig. 3 also serve as a stop or arresting means for flow-obstructing element 14 and the attached movable element of the galvanometer. This arresting of the movable element of the galvanometer does not do it any harm because of the absence of any positive mechanical coupling within the electric galvanometer. The on and off switching or activating and inactivating positions of the switching device 23 are indicated, for example, by indicia attached to the outer surface of housing cover 3 relative to which an index mark or pointer (not shown) on rotatable knob 23 is positionable.

Rotatable knob 23 and the aforementioned associated elements 24 and 25 also permit flow-obstructing element 14 to be adjusted manually to preselected exposure time indicia on scale 20 when the photoelectric cells of the automatic exposure regulator are blocked off from illumination. The lack of illumination causes pointer 19 to be maintained in firm contact with pin 25 at a preselected exposure time selecting position. This permits the pneumatic retarding device to be manually set as well as automatically regulated by the photoelectric means including galvanometer 16.

For eliminating even the aforementioned slight retarding influence which the inactivated pneumatic retarding device exerts upon the shutter, a force applying or accumulating means, for example, compensating spring 26, connects pin 27 upon rod 9 with adjustable link 28. Spring 26 is, therefore, tensioned upon upward movement of rod 9 when the shutter is cocked or tensioned. During the movement of the shutter it accelerates the downward movement of rod 9 and, therefore, reacts upon rod 9 in the same direction as the main shutter drive spring (not shown). Adjustable link 28 is rotatably mounted upon support 4 by a pivot joint 30. A screw 29 is attached to the end of link 28 and threaded through support 4 to adjustably rotate ring 28 about its pivot 30 to permit the amount of tensioning of compensating spring 26 to be varied.

Compensating spring 26 also acts upon rod 9 when the pneumatic retarding device is activated. This permits the frictional resistance incorporated in the pneumatic retarding device to be disregarded when the orifices 18 of valve plate 6 are constructed and arranged.

Instead of utilizing the additional compensating spring 26, the main drive spring of the shutter (not shown) can be pretensioned an additional amount over normal tensioning to eliminate the slight retarding effect of the inactivated pneumatic retarding device.

What is claimed is:

1. An exposure time regulating device for a photographic camera having a shutter comprising a pneumatic shutter retarding device, photoelectric means for measuring the ambient illumination, said pneumatic shutter retarding device including a perforated valve plate and a flow-obstructing member, galvanometer means operatively connecting said photoelectric means with said flow-obstructing member to permit said photoelectric means to adjust said pneumatic shutter retarding device to provide exposure times in accordance with said ambient illumination, a connecting means coupling said pneumatic shutter retarding device with said shutter, a manually-adjustable inactivating device incorporated in said pneumatic shutter retarding device for adjusting its regulating influence upon said shutter without disconnecting it from said shutter when said photoelectric means is blocked from said ambient illumination, and said inactivating means including a projection disposable at varying positions in the path of movement of said flow-obstructing member for arresting the movement of said flow-obstructing member at predetermined positions.

2. An exposure regulating device as set forth in claim 1 wherein said inactivating device includes a rotatable knob externally mounted upon and extending through the housing of said camera, an internal element connected to said knob, a projection mounted upon said internal element, said knob and attached internal element and projection being constructed and arranged relative to the path of movement of said flow-obstructing member to permit said projection optionally to be positioned free of said path of movement or in position to rotate said flow-obstructing member out of range of the perforations in said valve plate.

3. A photographic camera as set forth in claim 2 wherein said inactivating device includes motion arresting means for maintaining said flow-obstructing member at a predetermined position relative to said perforations against the opposing reaction of said galvanometer means.

4. An exposure regulating device as set forth in claim 1 wherein a visible scale is provided adjacent the path of movement of said flow-obstructing member, a pointer being attached to said flow-obstructing member in a position to move across said scale during the photoelectrically-controlled movement of said flow-obstructing member, window means incorporated in the housing of said camera for making said pointer and scale visible to a photographer, said scale including indicia positioned in accordance with exposure times provided by corresponding positions of said obstructing member, and said inactivating device being adjustable for positioning said flow-obstructing member relative to said indicia when said photoelectric means is blocked off from illumination to permit said pneumatic device to manually be adjusted to provide preselected exposure times.

5. An exposure regulating device as set forth in claim 1 wherein said pneumatic shutter retarding device is adjustable to a condition in which it exerts an insignificant slight minimum retarding influence upon said shutter, said camera includes a second shutter retarding device, said second shutter retarding device being manually adjustable and being connected to the shutter for alternative use with said pneumatic shutter retarding device, and said inactivating device being operable to a position in which it adjusts said pneumatic shutter retarding device to said condition whereby its influence upon said shutter is inactivated without disconnecting it from said shutter.

6. An exposure regulating device as set forth in claim 5 wherein a force-accumulating means is connected to said pneumatic shutter retarding device for substantially eliminating said minimum retarding influence which it exerts upon said shutter to permit said manually-adjustable shutter retarding device to solely control said shutter when said pneumatic shutter retarding device is inactivated.

7. An exposure regulating device as set forth in claim 6 wherein said force-accumulating means is comprised of a spring which reacts upon said retarding device connected to said photoelectric means in a direction to accumulate force when said shutter is tensioned and to react upon said retarding device connected to said photoelectric means in a direction to accelerate its motion when said shutter moves in operative motion.

8. An exposure regulating device as set forth in claim 6 wherein said compensating spring is connected to said camera by means of an adjustable linkage to permit the tensioning of said compensating spring to be varied.

9. An exposure time regulating device for a photographic camera having an automatic shutter retarding device and a manually-operable shutter retarding device for alternative use, photoelectric means for measuring the ambient illumination, a galvanometer-driven element operatively connecting said photoelectric means with said automatic shutter retarding device to permit said photoelectric means to adjust said automatic shutter retarding device to provide exposure times in accordance with said ambient illumination, coupling means connecting said manually-operable and said automatic shutter retarding devices to said shutter, a manually-adjustable inactivating device associated with said automatic shutter retarding device in a manner making it disposable in the path of movement of said galvanometer-driven element, and said automatic shutter retarding device exerting only an insignificant slight minimum retarding effect upon said shutter when said manually-operable inactivating devics is moved to a predetermined position in the path of movement of said galvanometer-driven element to substantially inactivate the influence of said automatic shutter retarding device without disconnecting it from said shutter.

10. An exposure regulating device as set forth in claim 9 wherein a force-accumulating means is connected to said automatic shutter retarding device for compensating said minimum retarding effect and substantially completely eliminating the influence from said shutter when it is inactivated.

11. An exposure time regulating device for a photographic camera having an automatic shutter retarding device, photoelectric means for measuring the ambient illumination, a galvanometer-driven element operatively connecting said photoelectric means with said automatic shutter retarding device to permit said photoelectric means to adjust said automatic shutter retarding device to provide exposure times in accordance with said ambient illumination, coupling means connecting said automatic shutter retarding device to said shutter, a manually-adjustable inactivating device associated with said automatic shutter retarding device, said inactivating device incorporating a stop element which is disposable in the path of movement of said galvanometer-driven element from one extremity of travel in which it is disposed out of the path of travel said galvanometer-driven element to permit said photoelectric means to control said exposure times to another extremity of travel in which it arrests the travel of said galvanometer-driven element in a condition in which it exerts only an insignificant slight minimum retarding effect upon said shutter without disconnecting said retarding device from said shutter, and said stop element being also disposable through a range of intermediate positions in which it preselectably arrests said galvanometer-driven element when said photoelectric means is blocked from said ambient illumination to permit said retarding device to be manually controlled to provide predetermined intermediate exposure times.

References Cited in the file of this patent

UNITED STATES PATENTS

| | | |
|---|---|---|
| 906,862 | Byers | Dec. 15, 1908 |
| 2,187,953 | Schmidt | Jan. 23, 1940 |
| 2,800,844 | Durst et al. | July 30, 1957 |

FOREIGN PATENTS

| | | |
|---|---|---|
| 489,348 | Italy | Jan. 19, 1954 |